United States Patent [19]

Stufflebeam et al.

[11] Patent Number: 5,555,824
[45] Date of Patent: Sep. 17, 1996

[54] OPERATOR CONTROLLED PRESSURE APPLICATOR FOR THE FURROW FORMING MECHANISM OF A SEED PLANTER

[75] Inventors: John F. Stufflebeam, Romeoville; Donald L. Ledermann, Darien, both of Ill.

[73] Assignee: Case Corporation

[21] Appl. No.: 381,427

[22] Filed: Jan. 31, 1995

[51] Int. Cl.⁶ .................................................. A01C 5/00
[52] U.S. Cl. ................................. 111/62; 111/69; 111/61; 172/624.5; 172/572
[58] Field of Search .................................. 111/62, 61, 69; 172/347, 348, 397, 398, 417, 424, 462, 506, 500, 515, 551, 566, 570, 571, 572, 621, 705, 624, 624.5; 267/255, 162, 175, 177, 289; 403/13, 109, 349, 348, 104, 106, 108

[56] References Cited

U.S. PATENT DOCUMENTS

| | | | |
|---|---|---|---|
| 1,305,423 | 6/1919 | Waterman | 111/61 |
| 1,481,981 | 1/1924 | Boye | 403/109 X |
| 2,277,703 | 3/1942 | Kennedy et al. | 403/109 X |
| 2,460,849 | 2/1949 | Schwarz | 267/289 X |
| 2,609,582 | 9/1952 | Kindorf et al. | 403/108 X |
| 2,637,262 | 5/1953 | Altgelt | 403/108 |
| 2,648,271 | 8/1953 | Youngs | 403/106 X |
| 2,899,776 | 8/1959 | Arnold | 172/624.5 |
| 3,567,261 | 3/1971 | Akczinski | 403/106 |
| 3,598,069 | 8/1971 | Hatcher | 111/62 X |
| 3,945,744 | 3/1976 | Metz | 403/349 X |
| 4,275,670 | 6/1981 | Dreyer | 111/61 X |
| 4,659,052 | 4/1987 | Nagata | 267/177 X |
| 4,702,323 | 10/1987 | Smit et al. | 172/264.5 X |
| 4,714,227 | 12/1987 | Holm et al. | 267/177 X |
| 4,744,316 | 5/1988 | Lienemann et al. | 111/69 |
| 4,905,770 | 3/1990 | Hanig | 172/624.5 X |
| 5,163,518 | 11/1992 | Foley | 172/462 |
| 5,186,197 | 2/1993 | Lavine | 403/349 X |
| 5,267,517 | 12/1993 | Jones | 111/62 |
| 5,398,771 | 3/1995 | Hornung et al. | 172/624.5 X |

Primary Examiner—Terry Lee Melius
Assistant Examiner—Victor Batson
Attorney, Agent, or Firm—Rudnick & Wolfe

[57] ABSTRACT

A mounting mechanism is disclosed for use in association with a row unit having a furrow forming apparatus as an integral part thereof. A linkage arrangement is provided for mounting the row unit to a tool bar of a tractor or the like thus allowing the furrow forming apparatus to follow the contour of the ground for consistent and efficient furrow formation. The mounting mechanism of the present invention includes a unique pressure applicator that allows for one-handed adjustment of the furrow forming mechanism on each row unit without the use of tools. The present invention is furthermore structured to facilitate adjustment of the pressure applicator along a predetermined path of travel relative to the linkage assembly that mounts the row unit to the tool bar.

35 Claims, 4 Drawing Sheets

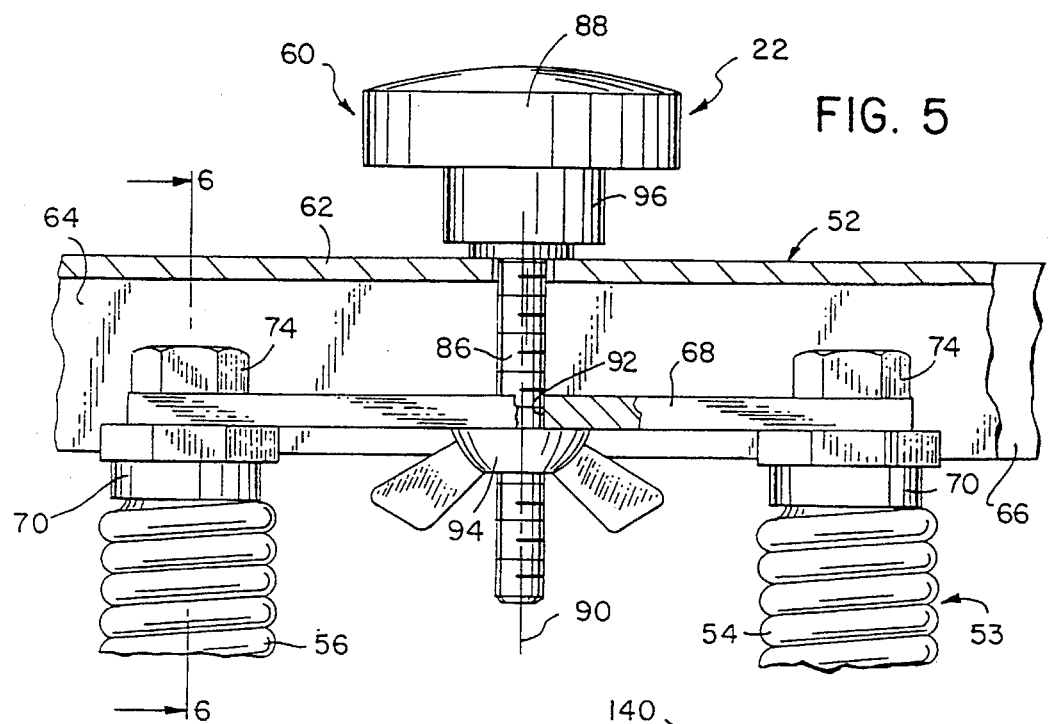
FIG. 5
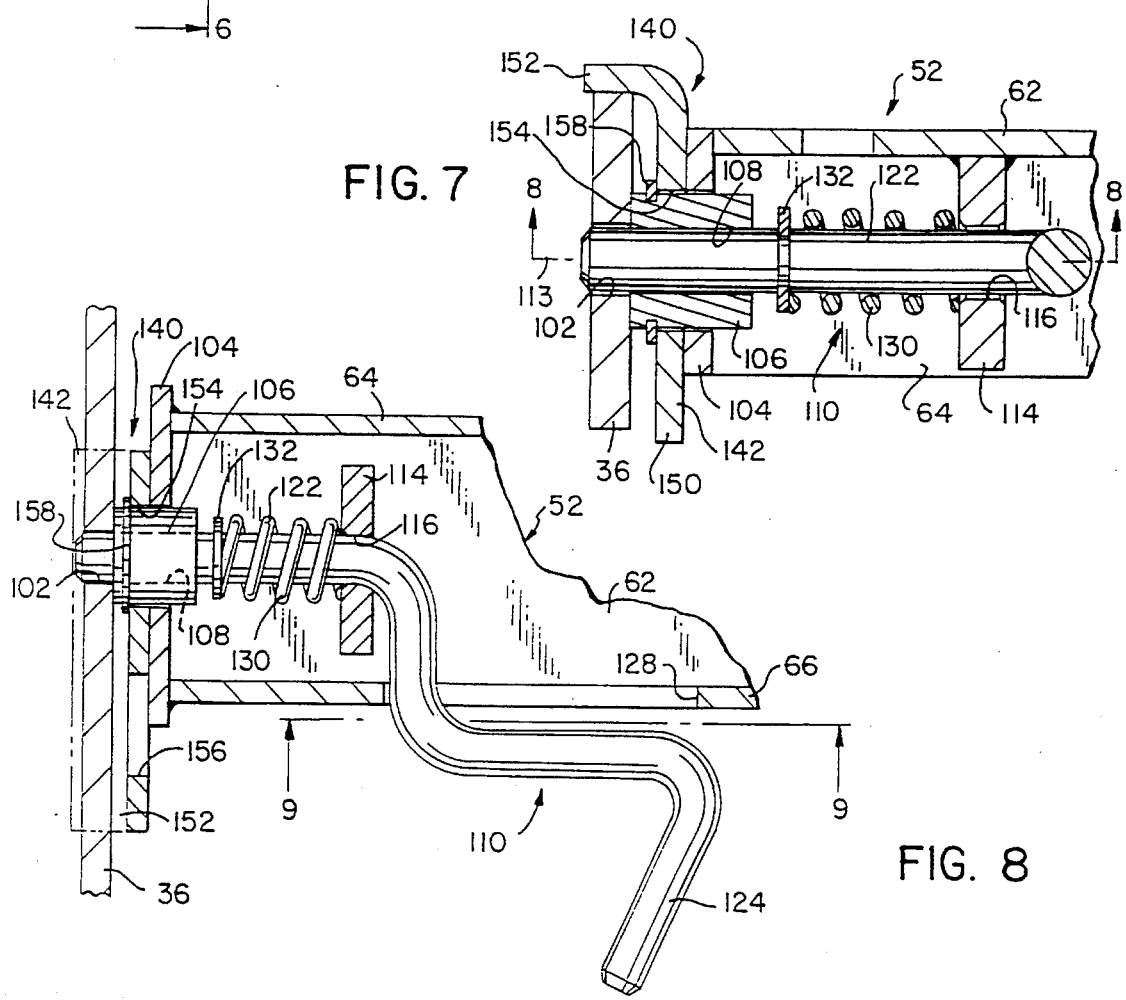
FIG. 7
FIG. 8

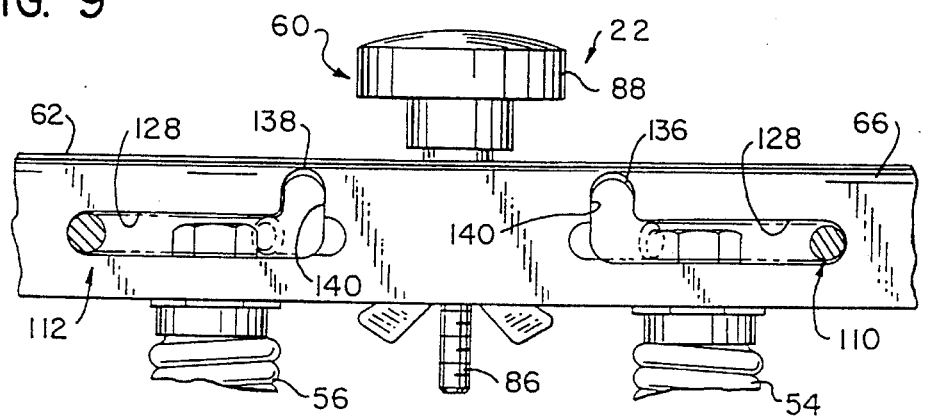
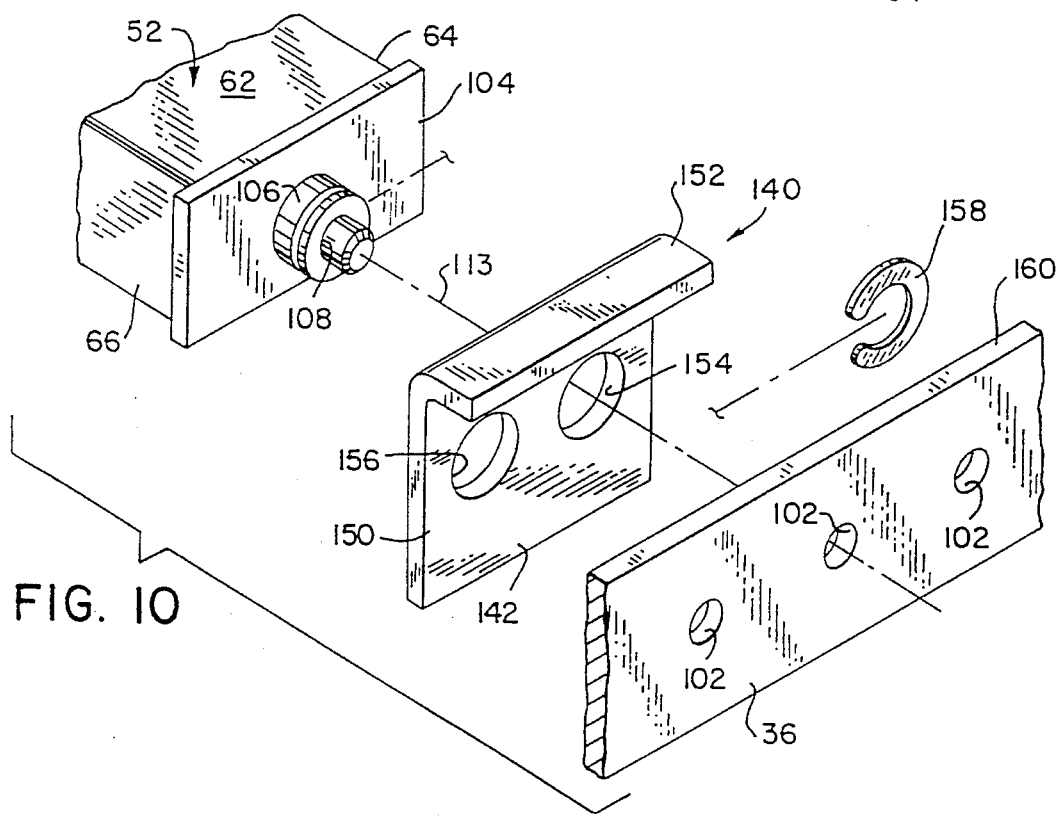
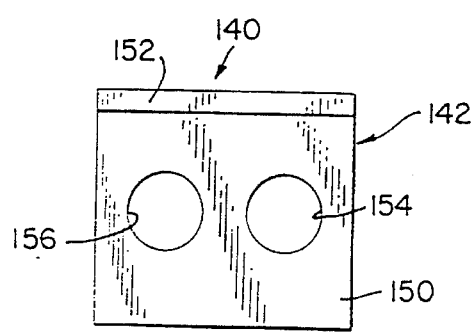
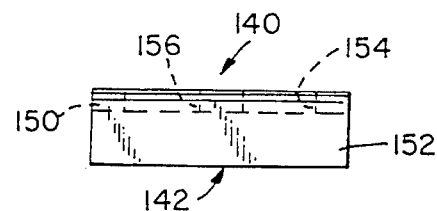

OPERATOR CONTROLLED PRESSURE APPLICATOR FOR THE FURROW FORMING MECHANISM OF A SEED PLANTER

FIELD OF THE INVENTION

The present invention generally relates to agricultural equipment and, more particularly, to a furrow forming implement for a seed planter row unit or similar apparatus having a unique pressure applicator for quickly and easily affecting manual adjustment of the pressures acting on the furrow forming mechanism of the row unit.

BACKGROUND OF THE INVENTION

A conventional seed planter implement includes a plurality of seed planter row units commonly mounted to a elongated tool bar or the like that is pulled across a field by a tractor or other suitable off-highway machine. It is not uncommon to mount as many as 24 seed planter row units in laterally spaced side-by-side relation relative to each other behind the tractor. The purpose of each seed planter row unit is to create a furrow having an accurate planting depth and into which a seed is deposited for germination and with reasonably accurate spacing being provided between consecutive seed deposits.

Accordingly, each seed planter row unit typically includes a furrow forming mechanism as part thereof. The furrow forming mechanism of each seed planter row unit conventionally includes a pair of rotatably mounted, generally flat, disk openers that substantially contact each other where the disks enter the ground and diverge apart rearwardly and upwardly. The disks are rotatably supported on a frame which is connected to a tool bar by a parallel support linkage so that the frame is maintained in a generally horizontal position parallel to the ground despite varying ground contours. A spring arrangement extends between the upper and lower links of the parallel linkage. The springs apply varying amounts of upward or downward pressure to the linkage arrangement thereby varying the force applied to the disks of the furrow forming mechanism to affect proper penetration of the soil.

Co-assigned U.S. Pat. No. 4,744,316 granted to D. Lienemann et al. was developed and designed to facilitate furrow forming under different soil conditions. The patented apparatus comprises a furrow forming mechanism including a pair of springs that are independently connected to a support transversely extending between longitudinally extending links of a linkage assembly used to connect a frame of the row unit to a tool bar. To satisfy different soil conditions, each spring on each seed planter row unit required independent and separate manual adjustment through use of a wrench or other form of tool so as to produce a furrow of generally equal depth. Accordingly, in those seed planter configurations embodying up to 24 row units, the operator was required to manually and independently adjust up to 48 different springs each time the spring force on the furrow forming mechanism required change to accommodate differences in soil conditions. Understandably, this involved a labor intensive and time consuming process.

The above mentioned apparatus furthermore allowed movement of the support between different settings. Each support setting allowed a predetermined range of spring forces to be applied by the springs to the furrow forming mechanism. A pair of manually operated locking pins transversely extended from opposite ends of the support and combined with longitudinally spaced holes provided in the links to releasably fix the support in a selected and adjustable position. The manually operated pins are disposed for manual engagement on the same side of the support as the spring adjustment mechanisms associated with each row unit. Accordingly, adjustment of either the springs or the support on each row unit was complicated by providing both manual adjustments in a common plane.

Movement of the support to an adjusted position was also complicated by the attachment of each of the springs to the support. That is, when the manually operated locking pins were released from their cooperative and releasable locking engagement with the linkage assembly, the springs tend to displace the support relative to the links of the linkage assembly thus complicating re-engagement of locking pins thereby frustrating the operators attempt to affect adjustment of the furrow forming mechanism.

Thus, there is a need and a desire for a seed planter row unit that is provided with a furrow forming mechanism that allows the pressure setting of the furrow forming mechanism to be quickly and easily adjusted without the use of tools.

SUMMARY OF THE INVENTION

In view of the above, and in accordance with the present invention, there is provided a furrow forming mechanism that is mounted on a row unit of an agricultural implement such as a seed planter or the like. The row unit has a frame on which the furrow forming mechanism is mounted. The essence of the present invention relates to a mechanism for mounting the frame with the furrow forming mechanism to a tool bar that is connected to a mobile power source. The mounting mechanism of the present invention includes a unique pressure applicator that allows for one-handed adjustment of the furrow forming mechanism on each row unit without the use of tools. The present invention is furthermore structured to facilitate adjustment of the pressure applicator along a predetermined path of travel relative to a linkage assembly that mounts the row unit to the tool bar.

In one embodiment of the invention, the linkage assembly that mounts the furrow forming mechanism includes a pair of generally parallel longitudinally extending links. The links are pivotally attached at opposite ends to a laterally elongated tool bar assembly and to the row unit frame. The pressure applicator is carded by the linkage assembly for applying selectively controlled pressures to the furrow foraging mechanism. The pressure applicator includes a support that is operably coupled to the linkage assembly. A spring mechanism preferably including a pair of springs is connected to and depends from the support for spring loading the links. According to one aspect of the present invention, a single operator controlled adjustable member is rotatably carded by the support for conjointly adjusting the spring loading force applied by both of the springs thereby regulating the pressure applied to the furrow forming mechanism without the use of tools.

In a preferred form the invention, the support includes a transversely elongated bracket having a generally planar top side. In illustrated embodiment of the invention, the adjustable member is rotatably supported on the bracket and includes an operator adjustable knob that manually turns in a plane disposed substantially parallel to the top side of the bracket. The adjusting member also includes a section that is operably associated with a tie plate disposed beneath and generally parallel to the top side of the support. Both springs of the spring mechanism are connected toward one end to the tie plate. In response to turning movements of the adjusting member, the tie plate moves toward or away from the support thereby adjusting the spring force applied the springs to the frame and thereby to furrow forming mechanism.

In the preferred embodiment of the invention, the pressure applicator further includes a manually controlled locking mechanism for releasably coupling the support to the linkage in selected and substantially identical positions between opposite ends of the links. In one form of the invention, the locking mechanism includes a pair of manually operated pins that are carried by and extend in transverse directions from opposite ends of the support. Each pin is guided for generally linear movement by the support. The locking pins define an axis about which the support rocks during operation of the row unit. Moreover, each link of the linkage assembly includes a plurality of longitudinally spaced openings therein. The opening in one link being transversely aligned with a corresponding opening in the other link and with the openings accommodating and releasably holding a respective one of the locking pins.

According to another aspect of the invention, the locking mechanism for releasably securing the support in an adjusted position is disposed in a different plane than that of the adjustable member. In the preferred form of the invention, the bracket comprising the support has a generally channel shaped configuration and further includes front and rear sides or surfaces that depend from the top side of the bracket. The locking mechanism further includes a pair of detents that are commonly provided on the bracket for releasably holding the locking pins in predetermined position relative to the links of the linkage mechanism. In a most preferred form of the invention, the detents are defined on at least one of the front or rear walls of the bracket and therefore are disposed in a plane different from the plane in which the adjustable member rotates thus facilitating adjustment of the support relative to the linkage assembly.

Still another aspect of the present invention relates to structure for moving the support along a predetermined path of travel during its adjustment to inhibit binding of the support during adjustment and to promote re-engagement of the locking mechanism. According to the present invention, the support further includes sash structure for limiting movement of the support along a predetermined path of supported travel regardless of whether the locking mechanism is controlled to releasably couple the support to the linkage assembly. The predetermined path of supported travel for the support is defined by a pair of transversely spaced generally parallel and longitudinally extending surfaces on the links comprising the linkage assembly. Preferably, the sash structure comprises a pair of brackets carried at opposite ends of the support. A portion of each bracket is slidably arranged in combination with respective support surfaces on the links. In a most preferred form of the invention, the brackets comprising the sash structure are interchangeable relative to each other and each bracket is pivotally secured between a free end of the support and a respective one of the links of the linkage assembly to promote rocking movement of the support during operation of the row unit.

Because there is only one adjustment member for conjointly controlling the spring force of both springs, each row unit has but a single adjustment for accommodating changes in the spring force applied to the furrow forming mechanism. Thus, the pressure applicator of the present invention allows for faster, quicker and easier sure adjustment of the furrow forming mechanism. Moreover, the manually engagable portion of the locking pins are in a different plane from that in which the adjustable member operates to allow better accessibility to the adjustment member and allow for quick turning adjustment of the rotatable knob. The tie bar arranged in combination with the support secures the ends of the springs together and locates them in a more solid state to work together.

An important aspect of the present invention is the sash structure that guides the support for movement along a supported path of travel. After the locking pins are released, the support would normally be free to move relative to the links under the influence of the springs. The sash structure added by the present invention controls the movement of the support along a supported path of travel thus promoting re-engagement of the locking pins in a selected position between opposite ends of the links. The sash structure is expected to allow for quicker and heavier spring load adjustments then heretofore known mechanisms. When the locking mechanism is released, the detents provided with the present invention releasably hold the locking pins in a released position until the operator re-engages the locking mechanism. In essence, the pressure applicator of the present invention facilitates adjustment of the furrow forming mechanism without tools and also saves manual labor and time which is at a premium when the row units are moved from one soil condition to another.

These and other numerous objects, aims and advantages for the present invention will become readily apparent from the following detailed description, accompanying drawings, and the appended claims.

BRIEF DESCRIPTION OF THE DRAWINGS

FIG. 5 is a partial sectional view taken along line 5—5 of FIG. 2;

FIG. 7 is an enlarged sectional view taken along line 7—7 of FIG. 3;

FIG. 8 is a sectional view taken along line 8—8 of FIG. 7;

FIG. 9 is a partial view taken along line 9—9 of FIG. 8;

FIG. 10 is a fragmentary perspective view of the component parts forming part of the present invention;

FIG. 11 is a side elevational view of a component part forming part of the present invention; and.

FIG. 12 is a plan elevational view of the part illustrated in FIG. 11.

DETAILED DESCRIPTION OF A PREFERRED EMBODIMENT

While the present invention is susceptible of embodiment in various forms, there is disclosed herein a presently preferred embodiment of the invention, with the understanding that the present disclosure is to be taken as an exemplification of the invention.

Figure 1:
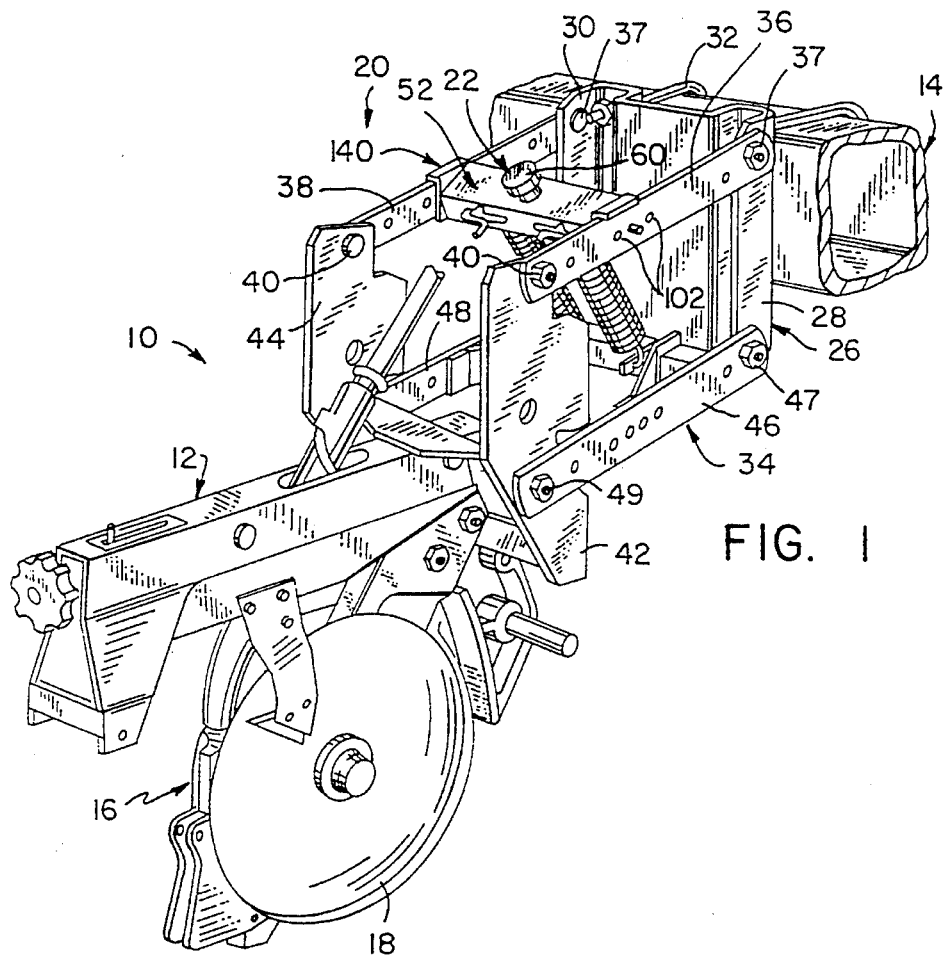
FIG. 1 is a perspective fight side view of an agricultural row unit and, more particularly, a seed planter row unit, incorporating the furrow forming apparatus in accordance with the present invention.

Referring now to the drawings, wherein like reference numerals refer to the like parts throughout the several views, in FIG. 1 there is schematically illustrated a row unit 10 forming part of an agricultural implement to which the present invention applies. In the illustrated embodiment of the invention, a seed planter row unit is illustrated for exemplary purposes and forms part of the agricultural implement. As would be appreciated by those skilled in the art, and although only one row unit is illustrated, the implement will normally comprise a plurality of row units that are mounted in combination and in side-by-side relation relative to each other. Whereas, it is not unusual for an agricultural implement to have as many as 24 row units mounted in side-by-side relation relative to each other. Since each row unit 10 of the implement is substantially similar, however, the present invention will be described in combination with only one row unit, with the understanding that each additional row unit on the implement can likewise embody the present invention.

Each row unit 10 has a fore-and-aft elongated frame 12. At its forward end, frame 12 is mounted to a mobile power source such as a laterally elongated tool bar assembly 14 that is, in turn, connected behind a tractor or other suitable power source. At its rear end, frame 12 has mounted thereto a conventional furrow forming apparatus 16.

The furrow forming apparatus 16 preferably includes a pair of rotatably mounted furrow forming discs 18. As is conventional, the discs 18 are mounted such that they substantially contact each other where they enter the ground and diverge apart rearwardly and upwardly. Although not shown, gauge wheels are typically provided and are pivotally supported on the frame 12 rearwardly of the discs 18.

The present invention is specifically directed to an assembly 20 for mounting the row unit frame 12 and the furrow forming mechanism or apparatus 16 to the tool bar assembly 14. As will be discussed in detail hereinafter, the assembly 20 includes an operator controlled pressure applicator 22 to facilitate selective adjustment of downward or upward pressures exerted on the furrow forming apparatus 16 to thereby increase or decrease the force applied to the discs 18 thereby ensuring that they properly penetrate the soil for furrow formation.

As shown in FIG. 1, the mounting assembly 20 preferably includes a head bracket 26 that includes longitudinally extending and transversely spaced flanges 28 and 30. Bracket 26 further defines suitable holes to promote connection of the head bracket 26 to the tool bar assembly 14 as by U-bolts 32. As shown, a linkage assembly 34 longitudinally extends rearwardly from and is articulately connected toward a front end to bracket 26. The linkage assembly 34 is likewise articulately connected to the furrow forming apparatus 16 so as to permit generally vertical movements of the discs 18.

In the illustrated form of the invention, linkage assembly 34 includes a pair of transversely spaced longitudinally extending upper links 36 and 38 and a pair of transversely spaced longitudinally extending lower links 46 and 48. The upper links 36 and 38 are pivotally connected at their forward ends to upper portions of flanges 28 and 30, respectively, of bracket 26 by suitable pivot fasteners 37. The upper links 36 and 38 are connected toward their second or rear ends, by suitable pivot fasteners 40, to upper portions of transversely spaced brackets 42 and 44, respectively. Brackets 42 and 44 are rigidly secured to frame 12 of the row unit 10.

The lower links 46 and 48 of linkage assembly 34 are pivotally connected toward their first or forward ends to lower portions of flanges 28 and 30, respectively, of bracket 26 by suitable pivot fasteners 47. The lower links 46 and 48 are connected toward their second or rear ends, by suitable pivot fasteners 49, to lower portions of the transversely spaced brackets 42 and 44 respectively. To facilitate assembly, the upper pair of links 36, 38 and the lower pair of links 46, 48 are identical to each other. Moreover, the upper pair of links 36, 38 and the lower pair of links 46, 48 extend generally parallel to each other to form a parallelogram-type linkage that allows the furrow forming mechanism 16 to follow the ground contour during operation for consistent furrow formation.

Figure 2:
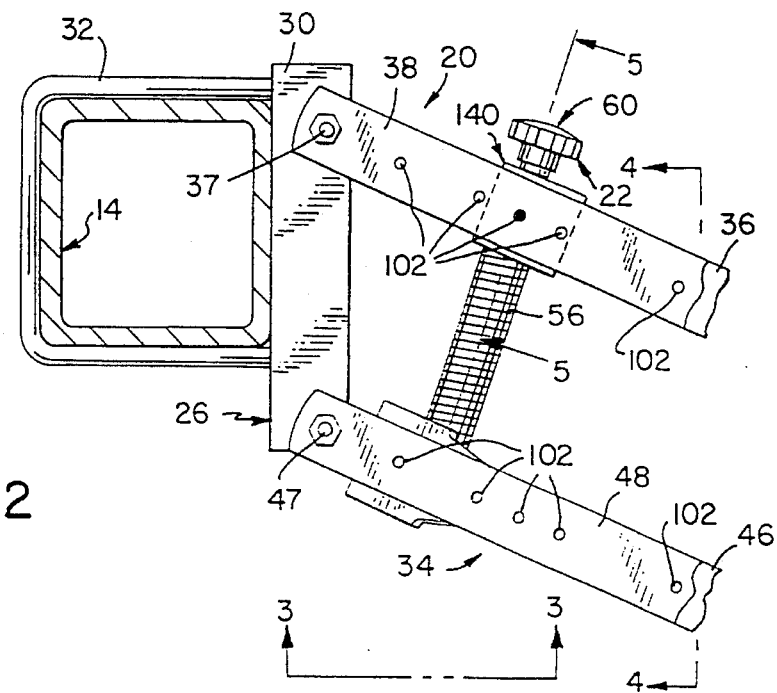
FIG. 2 is a fragmentary enlarged side elevational view of a mounting mechanism forming part of the furrow forming apparatus of the present invention.
Figure 3:
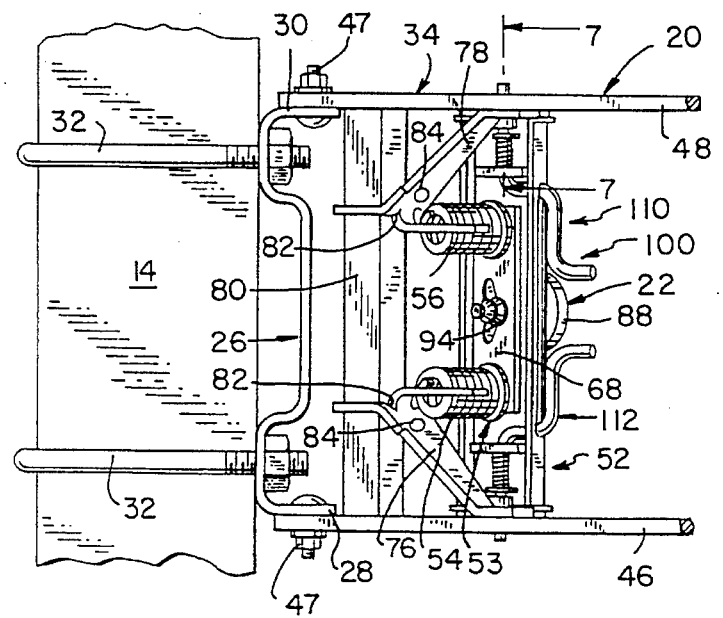
FIG. 3 is a partial bottom view of that illustrated in FIG. 2.
Figure 4:
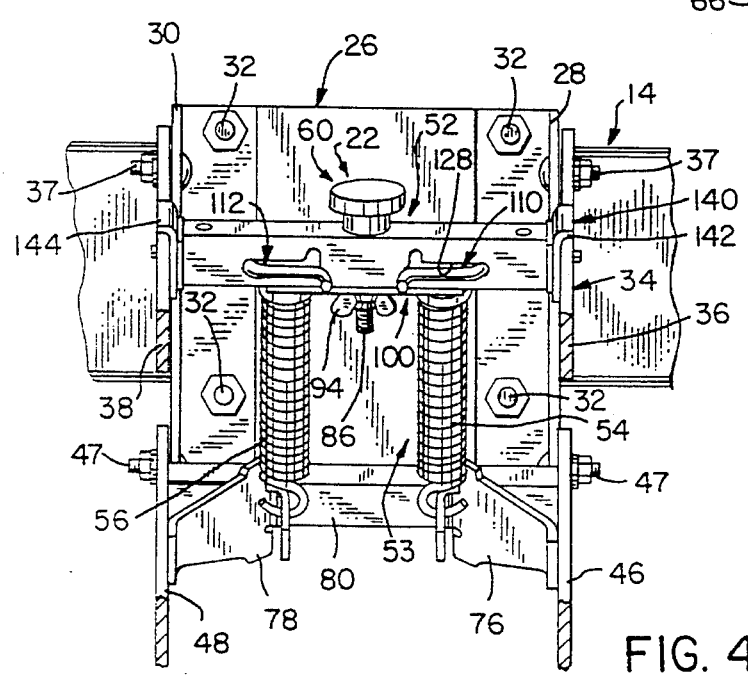
FIG. 4 is a view taken along line 4—4 of FIG. 2.

As shown in FIGS. 2, 3 and 4, the pressure applicator 22 is carried by the linkage assembly 34 for applying selectively controlled pressures to the furrow forming mechanism or apparatus 16. The pressure applicator 22 preferably includes a support 52 operably coupled to the linkage assembly 34. A spring mechanism 53 including one or more springs is provided for applying a spring loaded force to the linkage assembly 34. In a most preferred form of the invention, the spring mechanism 53 includes a pair of tension coil springs 54, 56 are connected to and depend from the support 52 for spring loading the linkage assembly 34. One of the salient features of the present invention relates to a single operator accessible and controlled adjustment member 60 that is rotatably carried by the support 52 for conjointly adjusting the spring loading force applied by both springs 54, 56 of the spring mechanism 53 thereby regulating the pressure applied to the furrow forming mechanism 16 without the use of tools.

Figure 6:
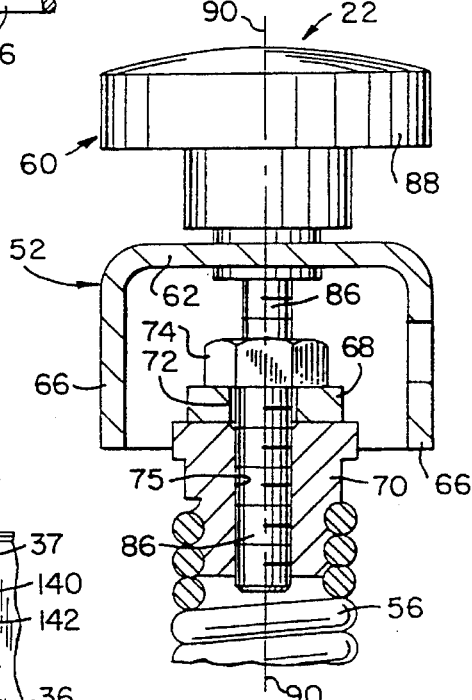
FIG. 6 is a view taken along line 6—6 of FIG. 5.

In a preferred form of the invention, support 52 comprises a transversely elongated channel shaped bracket. As shown in FIGS. 3 and 4, support 52 transversely extends between the upper links 36, 38 of linkage assembly 34. As shown in FIGS. 5 and 6, support 52 comprises a generally planar top or upper side or wall 62 with generally parallel and transversely extending front and rear surfaces or walls 64 and 66, respectively, depending therefrom.

As shown in FIGS. 5 and 6, the pressure applicator 22 further includes a transversely elongated tie plate 68 that is disposed beneath and generally parallel to the top side 62 of channel or support 52. As will be appreciated, the tie plate 68 fits between the front and rear surfaces 64 and 66 of the support channel 52.

As shown in FIG. 5, the springs 54 and 56 are connected to opposite ends of the tie plate 68 preferably in equally spaced transverse relation from the adjustable member 60. In the illustrated form of the invention, and as shown in FIG. 6, the upper end of each coil spring 54, 56 is provided with and attached to a helical spring lock 70. An aperture 72 in the tie plate 68 permits endwise passage of a threaded fastener 74 therethrough. A threaded portion of each fastener 74 threadably engages with a threaded bore 75 in the respective spring lock 70 thereby fastening the respective spring to the tie plate 68.

As best seen in FIGS. 3 and 4, the opposite ends of springs 54, 56 are releasably connected to corresponding brackets 76 and 78 that longitudinally extend rearwardly from a lower support channel 80. Channel 80 is rigidly connected between and preferably moves with the lower links 46, 48 of linkage assembly 34. Each bracket 76, 78 is preferably provided with at least a pair of longitudinally spaced openings 82, 84. The lower ends of springs 54, 56 are preferably hook shaped and are releasably held in a select one of the openings 82, 84.

Returning to FIGS. 5 and 6, the adjustment member 60 preferably includes a vertically elongated threaded section 86 and an operator accessible knob 88. The threaded section 86 of member 60 turns about a fixed rotational axis 90 extending generally normal to the top surface or wall 62 of channel 52. As shown in FIG. 5 the threaded section 86 on member 60 extends endwise through and is threadably engaged with an aperture 92 centrally defined in the tie plate 68. A jam nut, thumb screw or wing nut 94 is arranged on the underside of the tie plate 68 to releasably lock the tie plate 68 in position.

The rotatable knob 88, fastened to the opposite end of the threaded section 86, turns under operator influence in a plane disposed substantially parallel to the top side 62 of support 52. As shown, knob 88 is provided with a hub 96 that depends from the knob 88 and engages with the upper or top side 62 of channel 52. As will be appreciated, the present invention provides a single adjustable knob 88 which, when turned in a plane extending generally parallel to the upper side 62 of support 52 and about axis 90, adjusts the distance separating the tie plate 68 from the support 52 thereby conjointly adjusting the spring force supplied by both of the springs 54, 56 to the linkage assembly 34 and thereby to the furrow forming mechanism or apparatus 16 without the use of tools.

Another salient feature of the present invention relates to a manually controlled locking mechanism 100 that releasably couples the support 52 to the linkage assembly 34 in selected and identical longitudinal positions. In a preferred form of the invention, and as shown in FIGS. 2 and 10, each upper link 36, 38 of linkage assembly 34 is provided with a plurality of longitudinally spaced openings 102 formed therein. The openings 102 in link 36 are in transverse alignment with corresponding openings 102 in link 38. Moreover, and as shown in FIGS. 7, 8 and 10, each end of the channel shaped support 52 is provided with an end wall 104 that extends between the front and rear wall 64, 66 and depends from the top wall 62 of support 52. For purposes described in detail below, each end wall 104 carries or otherwise has affixed thereto a bushing 106 that defines a central transversely extending bore 108.

The locking mechanism 100 further comprises a pair of manually operated locking pins 110 and 112 that are carded by and extend in transverse directions from opposite ends of the support 52. Pins 110 and 112 are mirror images of each other and, thus, only locking pin 110 will be described in detail with the understanding that pin 112 is substantially similar.

As shown in FIGS. 7 and 8, support 52 further includes a bracket or partition wall 114 that is transversely spaced from the respective end wall 104 of channel 52 and depends from an extends generally normal to the top side or surface 62 of support 52. Each bracket 114 defines an aperture 116 that is transversely aligned with the aperture 108 in the bushing 106 carded by the transversely spaced end wall 104.

Each locking pin 110, 112 comprises a transverse portion 122 and a handle portion 124 connected thereto. As shown in FIG. 8, the handle portion 124 of each locking pin 110, 112 extends through a transverse generally elongated slot 128 preferably performed in the rear wall or surface 66 of the support 52 and is movable between the respective ends of the slot 128. Notably, and as shown in FIG. 8, the distal end of the handle portion 124 of each locking pin, 110, 112 is turned or angled outwardly relative to the respective wall 66 of channel 52 to facilitate operation of the locking mechanism 100.

In the illustrated form of the invention, an inner end of the transverse portion of each locking pin 110, 112 is connected and extends from the handle portion 124. As shown, the transverse portion 122 of each locking pin passes endwise through and is guided by aperture 116 in bracket 114 and aperture 108 in bushing 106 carried by the end wall 104. In the illustrated form of the invention, the transverse portions 122 of the locking pins 110 and 112, are axially aligned relative to each other and, in combination, define an axis 113 about which support 52 is permitted to rock during operation of the row unit.

Each locking pin 110, 112 is transversely movable along a predetermined path of travel between an extended, first or retaining position wherein the outer end of the transverse portion 122 of the locking pin extends outwardly of support 52 and is received through an opening 102, and a second retracted position wherein the out end of the transverse portion 122 of the locking pin is positioned generally within the support 52.

Each locking pin 110, 112 is carded by support 52 in a manner which biases the pin towards its first or locking position. In the illustrated embodiment of the invention, a compression coil spring member 130 is received about the transverse portion 122 of each locking pin and is held in captive relation between the partition wall or bracket 114 and an annular retainer 132 that is received about and connected to the transverse portion of the locking pin in transversely spaced relation from bracket 114.

As shown in FIG. 9, to facilitate its adjustment, support 52 further includes a pair of detents 136 and 138 for holding the locking pins 110, 112 in a predetermined position relative to the linkage assembly 34. As shown in FIG. 9, the detents 136, 138 are preferably provided on the rear surface 66 of the support 52 for releasably holding the locking pins 110, 112 out of engagement with the linkage assembly 34. As shown in FIG. 9, the detents 136 and 138 are configured as slots 140 that extend generally normal to and are provided toward the inner ends of the slots 128. The slots 140 are configured to releasably accommodate and hold a portion of the locking pins 110 and 112. As will be appreciated, the action of spring 130 associated with each locking pin, will hold the respective locking pin in place within the respective detent until manually released.

Still another feature of the present invention concerns sash structure 140 for limiting movement of the support to a predetermined path of travel regardless of whether the locking mechanism 100 is controlled to releasably couple the support 52 to the linkage assembly. In the illustrated form of the invention, and as shown in FIG. 4, sash structure 140 is comprised of a pair of support brackets 142 and 144 pivotally carried at opposite ends of the support 152. The support brackets 142 and 144 comprising the sash structure 140 are substantially identical relative to each other, and therefore a description of only bracket 142 will be provided with the understanding that support bracket 144 is substantially similar.

As shown in FIGS. 10, 11 and 12, each support bracket comprises a planar and generally vertical leg portion 150 and a generally horizontal leg portion 152 that extends normal to leg portion 150. As shown, the vertical leg portion 150 of each support bracket defines a pair of longitudinally spaced and identical apertures or holes 154 and 156. Each hole 154, 156 is sized to fit about the bushing 106 carried by the end wall 104 and extending from channel 52. A suitable fastener, such as a annular snap ring or clip 158 rotatably fastens the support bracket to the respective end of the support 52 such that the bracket is interposed between the channel 52 and the respective link of the linkage assembly 34. Notably, by providing holes 154, 156 in each bracket, the brackets 142 and 144 are interchangeable relative to each other.

The other leg portion 152 of each support bracket supports the channel 52 for generally pivotal movement about the pivot axis 113 defined by the axially aligned pins 110 and 112 and furthermore promotes sliding movement of the support 52 along a predetermined path of travel after the locking mechanism 100 has been released. In the preferred form the invention, the predetermined path of travel for the support 52 is defined by the interaction between the sash structure 140 and a suitable support surface defined by linkage assembly 34. In a most preferred from of the invention, the horizontal leg portion 152 of each support bracket is guided and supported by an upper surface 160 of the links 36, 38 comprising part of the linkage assembly 34.

It will be quite apparent from the discussion of the operation of the present invention which herein follows that an arrangement is provided which permits quick and easy adjustment of the pressures applied by the springs 54 and 56 to the linkage assembly 34 and therefore to the furrow forming apparatus or mechanism 16.

As will be appreciated, when the channel 52 is adjusted along its predetermined path of travel such that the upper ends of the springs 54, 56 are spaced farther from the pivot fasteners 37 of the upper links 36 and 38, compared to the spacing of lower ends of the springs 54 and 56 from the pivot fasteners 47 for the lower links 46 and 48, the linkage assembly 34 is spring loaded downward thus supplying a downward force to the disks 18 of the furrow forming apparatus 16 to insure that the disks 18 penetrate the soil. It can be appreciated that adjustment of the relative positions of the upper and lower ends of the springs 54 and 56 is effective to increase or decrease the pressure applied by the springs 54 and 56 to the linkage assembly 34. That is, as the upper ends of the springs 54 and 56 are moved forward in relationship to the lower ends of the springs, the downward pressure on the disks 18 is decreased. The relative positions of the upper and lower ends of the springs 54 and 56 is dependent upon the location of the support channel 52 relative to the linkage assembly 34, the selection of the openings 82 and 84 in brackets 76 and 78 to which the lower hook ends of the springs 54 and 56 are releasably coupled, and the position of the lower support channel 80 between the lower links 46 and 48 (note the provision of spaced mounting openings in each of the lower links 46 and 48).

Should it be desired to exert an upward pressure on the parallel linkage assembly 34 by the springs 54 and 56, the lower ends of the springs 54 and 56 are positioned relatively rearwardly of the upper ends of the springs. This can be readily accomplished by hooking or anchoring the lower ends of the springs 54 and 56 in the rear slots or holes in the brackets 76 and 78 (FIG. 3), and longitudinally positioning the support 52 toward the pivot fasteners 37.

According to the present invention, the axially aligned locking pins 110 and 112 of locking mechanism 100 define an axis 113 about which the support channel 52 rocks depending upon its longitudinal placement along in its predetermined path of travel. As will be appreciated, the locking pins 110 and 112 of locking mechanism 100 selectively couple the support 52 in a selected position between opposite ends of the linkage assembly 34. To position the support 52 in its desired position, the operator merely grasps the handle portions 124 and moves the locking pins 110 and 112 into their second retracted positions against the bias of springs 130. The support channel 52 is then longitudinally positioned between the selected, transversely aligned openings 102 and the handle portions 124 are released causing the resiliently biased locking pins 110, 112 to move into their first positions with the ends of the transverse portions 122 extending through the selected openings 102. It can be appreciated that, in so doing, the pressure exerted on the parallelogram type linkage assembly 34 by the springs 54 and 56 can be adjusted in increments to achieve the required pressure on the disks 18.

With the present invention, and to facilitate a longitudinal adjustment of the channel 52, the detents 136 and 138 are provided to releasably hold the locking pins 110 and 112, respectively in their second or retracted position. After the support channel 52 is longitudinally adjusted, the locking pins 110 and 112 can be readily released from the detents 136 and 138 so as to allow the locking pins to move toward their first or engaged position under the influence of springs 130.

The force exerted by springs 54 and 56 on the linkage assembly 34 and thereby to the furrow forming mechanism 18 may be further adjusted under the influence of the pressure applicator 22. More particularly, each opening or hole 102 between opposite ends of the linkage assembly represents a predetermined range of pressure settings for the furrow forming mechanism 16. The effectiveness of the springs 54 and 56 relative to each setting of the channel 52 is selectively controlled by the readily accessible operator controlled knob 88 of the pressure applicator 22. Notably, the knob 88 is designed to turn in a plane that is substantially parallel to the top side 62 of the channel support 52. In contrast, and in a preferred form of the invention, the locking pins 110 and 112 are disposed on a rear surface or side 66 of the support channel 52 so as to not interfere with operation of the adjusting knob. Moreover, a salient feature of the present invention is that adjustment of the knob 88 conjointly affects both springs 54 and 56, thus, substantially reducing the number of adjustments required of the row units. As will be appreciated, turning of the knob 88 adjusts the spacing of the tie plate 68 relative to the support 52 thus providing a finer range of adjustment for the spring force applied by springs 54 and 56 within the range of the position chosen for support 52. In those implement embodiments having up to 24 row units, the provision of a single adjustable knob 88 for each row unit reduces by one-half the number of adjustments heretofore required of such combinations of the row units.

The sash structure 140 associated with the pressure applicator 22 furthermore promotes adjustment of the support 52 by limiting movement of the channel 52 to a predetermined path of travel while inhibiting binding of the support 52 during longitudinal adjustment thereof. Accordingly, when the locking mechanism 100 is released, the sash structure 140 limits the support 52 to a predetermined path of travel notwithstanding the pressure exerted on the support 52 by the springs 54 and 56. In the illustrated form of the invention, the sash structure 140 guides the support channel 52 along the support surface defined by the linkage assembly 34. As will be appreciated, limiting movement of the support channel 52 to a predetermined path of travel facilitates longitudinal adjustment of the support 52 and promotes reengagement of the locking mechanism 100 by maintaining the locking pins 110 and 112 in proper orientation relative to the holes or openings 102 in the links 36 and 38 of the linage assembly 34.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A furrow-forming apparatus arranged in combination with a row unit on an agricultural implement, said apparatus having a frame adapted to be attached to a tool bar assembly, a furrow forming mechanism mounted on said frame, and a mounting assembly for mounting said frame and said furrow forming mechanism to said tool bar, said mounting mechanism comprising:

a linkage assembly including a pair of generally parallel longitudinally extending links pivotally attached at opposite ends to said tool bar and said frame; and an operator controlled dual adjustment pressure applicator carried by said linkage assembly for applying selectively controlled pressures to said furrow forming mechanism, said pressure applicator comprising a movable support extending between and adjustable along said links, a pair of springs each connected at one end to said movable support and depending from said support for spring loading said links, a first adjustment mechanism for releasably locking said support in a plurality of selected positions along said links to move said one ends of the springs in a generally oblique direction relative to the axes of said springs to thereby adjust the effective length of the springs in a first manner, and a single operator controlled second adjustment mechanism for conjointly adjusting the said one ends of the springs along the respective axes thereof to thereby adjust the effective length of the springs in a second manner, each of said adjustment mechanisms thereby regulating the spring loading force applied by both of said springs and thus the pressure applied to said furrow forming mechanism.

2. The furrow forming apparatus according to claim 1 wherein the support of said pressure applicator includes a transversely elongated bracket having a generally planar top side, and wherein said second adjustment mechanism further includes a tie plate disposed adjacent the top side of the bracket and to which both springs are connected, said tie plate being movable with said support during adjustment in said first manner.

3. The furrow forming apparatus according to claim 2 wherein said second adjustment mechanism further comprises an adjustment member rotatably carded by said support and includes a section threadably connected to said tie plate for adjusting the distance between said tie plate and said support thereby adjusting the spring force applied by said springs to the linkage assembly in said second manner and thereby to the furrow forming mechanism.

4. The furrow forming apparatus according to claim 3 wherein said adjustment member includes an operator accessible and rotatable knob that turns under operator influence in a plane disposed substantially parallel to the top side of said bracket.

5. The furrow forming apparatus according to claim 1 wherein said first adjustment mechanism comprises a manually controlled locking mechanism for releasably coupling said support to said links in selected positions along and between said links.

6. The furrow forming apparatus according to claim 5 wherein said pressure applicator further includes structure carried by and with said support for guiding movement of the support to a predetermined path of travel regardless of whether the locking mechanism is controlled to releasably couple the support to the linkage assembly.

7. A furrow-forming apparatus arranged in combination with a row unit on an agricultural implement and having a frame adapted to be attached to a tool bar, a furrow forming mechanism mounted on said frame, and a mounting assembly for mounting said frame and said furrow forming mechanism to said tool bar, said mounting mechanism comprising:

a linkage assembly including a pair of longitudinally extending links pivotally attached at opposite ends to said tool bar and said frame, said links defining a pair of transversely spaced generally parallel longitudinally extending support surfaces; and a pressure applicator carried by said linkage assembly for applying pressure to said furrow forming mechanism, said pressure applicator including a support transversely disposed between said links of said linkage assembly, a locking mechanism for selectively securing said support to and between opposite ends of said links, a spring mechanism including one or more springs connected to and depending from said support for applying a spring loaded force to said linkage assembly and thereby to said furrow forming mechanism, and wherein said support includes a sash structure for guiding longitudinal sliding movements of the support along a predetermined path of supported travel defined by said support surfaces after the locking mechanism has been released to allow for longitudinal adjustment of the support and to promote reengagement of the locking mechanism.

8. The furrow forming apparatus according to claim 7 wherein said locking mechanism includes a pair of manually operated pins carried by and extending in transverse directions from opposite ends of said support, and wherein each link includes a plurality of longitudinally spaced openings defined therein generally in transverse alignment with corresponding openings in the other of said links for accommodating and releasably holding a respective one of said locking pins.

9. The furrow forming apparatus according to claim 8 wherein said support includes a transversely elongated bracket that defines detents for releasably holding said locking pins in a predetermined position relative to said links.

10. The furrow forming apparatus according to claim 7 wherein the sash structure comprises a pair of brackets carded at opposite ends of said support, with a portion of each bracket being slidably arranged in combination with a respective upper surface of one of said links to inhibit binding of the support during longitudinal adjustment thereof.

11. The furrow forming apparatus according to claim 10 wherein the brackets comprising the sash structure are interchangeable relative to each other and each bracket is pivotally secured between a free end of said support and a respective one of said links.

12. The furrow forming apparatus according to claim 7 wherein said spring mechanism includes a pair of springs that are conjointly connected to and depend from said support.

13. The furrow forming apparatus according to claim 12 further including a single adjustable operator controlled knob disposed in combination with the support for manually and conjointly adjusting the spring loaded force applied by both springs to said linkage and thereby to said furrow forming mechanism.

14. A furrow-forming apparatus for a row unit of an agricultural implement, said apparatus having a frame adapted to be attached to a tool bar, a furrow forming mechanism mounted on said frame, and a mounting assembly for mounting said frame and said furrow forming mechanism to said tool bar, said mounting mechanism comprising:

a linkage assembly including a pair of longitudinally extending links pivotally attached at opposite ends to said tool bar and said seed planter frame; and a pressure applicator carried by said linkage assembly for applying pressure to said furrow forming mechanism, said pressure applicator comprises a movable support transversely disposed between said links of said linkage assembly, a spring mechanism including a pair of springs for applying a spring force to said links, a tie bar extending generally parallel to and in spaced relation from said support and to which one end of each spring of the spring mechanism is connected, said tie bar being movable with said support for effecting adjustment of the spring in a first manner and an operator controlled adjustment assembly for selectively controlling the spaced relationship between said tie bar and said support thereby adjusting the spring force applied by both springs of the spring mechanism to the frame and furrow forming mechanism in a second manner through the adjustment assembly without requiring the use of tools.

15. The furrow forming apparatus according to claim 14 wherein said linkage assembly further includes at least one other longitudinally elongated link that is pivotally attached at opposite ends to said tool bar and to said seed planter frame in vertically spaced relation relative to said pair of links, said at least one other link being substantially the same length as said pair of links.

16. The furrow forming apparatus according to claim 14 wherein said support includes an elongated transverse channel shaped bracket having an upper surface with front and rear surfaces depending therefrom.

17. The furrow forming apparatus according to claim 14 further including a locking mechanism for selectively locking said support in a longitudinally adjusted position relative to said links of the linkage assembly.

18. The furrow forming apparatus according to claim 17 wherein said locking mechanism comprises a pair of axially aligned locking pins transversely projecting outwardly from opposite ends of and guided for sliding movement by said support, a free end of each locking pin being movable into releasable locking engagement with a respective one of said pair of links.

19. The furrow forming apparatus according to claim 18 wherein a pair of detents are provided on said support for releasably holding said locking pins in a predetermined position relative to a respective one of said pair of links.

20. The furrow forming apparatus according to claim 14 wherein said adjustment member comprises a manually adjustable knob rotatably carried on said support and threadably engaged with said tie bar for conjointly adjusting the spring force applied by said sp rings on said linkage mechanism and thereby to said furrow forming mechanism.

21. The furrow forming mechanism according to claim 14 further including a sash mechanism for supporting the support for sliding movement along an upper surface of and relative to said pair of links of said linkage assembly.

22. The furrow forming apparatus according to claim 21 wherein said sash mechanism comprises a pair of brackets carried at opposite ends of said support for allowing said support to rock about an axis defined by said locking pins.

23. In a furrow-forming apparatus for a seed planter having a frame adapted to be attached to a tool bar, a furrow forming mechanism mounted on said frame, and a mounting assembly for mounting said frame and said furrow forming mechanism to said tool bar, said mounting mechanism comprising:

a parallelogram-type linkage assembly including a pair of transversely spaced longitudinally extending upper links pivotally secured at opposite ends to said tool bar and to said seed planter frame, and a pair of transversely spaced longitudinally extending lower links pivotally secured at opposite ends to said tool bar and to said seed planter frame; and a pressure applicator carried by said linkage assembly for applying pressure to said furrow forming mechanism, said pressure applicator comprising a support transversely disposed between the upper links of said linkage assembly, a locking mechanism for selectively securing said support to and between opposite ends of said upper links, a spring assembly including one or more springs is connected to and depends from said support for applying a spring loaded force to said linkage mechanism and thereby to said furrow forming mechanism, sash structure pivotally attached to opposite ends of said support for promoting sliding movements of the support along a predetermined path of travel after the locking mechanism has been released and for enhancing reengagement of the locking mechanism to secure the support in an adjusted position disposed between opposite ends of said upper links.

24. The furrow forming apparatus according to claim 23 wherein said spring assembly includes a pair of transversely spaced springs connected to said support.

25. The furrow forming apparatus according to claim 24 further including a single operator controlled adjustment member for selectively and conjointly adjusting the spring force applied by both of said springs to said linkage assembly and thereby to the furrow forming mechanism.

26. The furrow forming apparatus according to claim 23 wherein said locking mechanism comprises a pair of axially aligned manually operated locking pins that transversely project from opposite ends of said support.

27. The furrow forming apparatus according to claim 26 further including detents provided on said support for releasably holding the locking pins out of engagement with said upper links.

28. In a furrow-forming apparatus for a seed planter having a frame adapted to be attached to a tool bar, a furrow forming mechanism including a pair of ground engaging disks rotatably mounted on said frame, and an assembly for mounting said frame and said furrow forming mechanism to said tool bar for generally vertical movements, said mounting mechanism comprising:

a parallelogram-type linkage assembly including a pair of transversely spaced longitudinally extending upper links pivotally secured at opposite ends to said tool bar and to said seed planter frame, and a pair of transversely spaced longitudinally extending lower links pivotally secured at opposite ends to said tool bar and to said seed planter frame; and a pressure applicator carried by said linkage assembly for applying pressure to said furrow forming mechanism, said pressure applicator comprising a support transversely disposed between the upper links of said linkage assembly, a locking mechanism for selectively securing said support to and between opposite ends of said upper links, a spring mechanism including a pair of transversely spaced springs connected to and depending from said support for applying a spring loaded force to said linkage mechanism and thereby to said furrow forming mechanism, sash structure pivotally attached to opposite ends of said support for promoting sliding movements of the support along a predetermined path of travel after the locking mechanism has been released and for enhancing reengagement of the locking mechanism to secure the support in an adjusted position disposed between opposite ends of said upper links, and a single operator controlled adjusting member carded by said support and operator accessible for conjointly adjusting the spring force applied by both of said springs thereby regulating the pressure applied to said furrow forming mechanism.

29. The furrow forming apparatus according to claim 28 wherein said support comprises a transversely elongated bracket including a generally planar top wall with front and rear walls extending therefrom.

30. The furrow forming apparatus according to claim 29 further including a tie plate disposed beneath and generally parallel to the top wall of said support and to which both springs are connected.

31. The furrow forming apparatus according to claim 30 wherein said adjusting member comprises a knob carded by said support and rotatable in a plane extending generally parallel to the top wall of the support, said knob including a portion that threadably engages with said tie plate to adjust the spacing therebetween and such that spring force applied by both springs is commonly adjusted through turning movement of the single adjustment member.

32. The furrow forming apparatus according to claim 28 wherein the locking mechanism comprises a pair of axially aligned locking pins that normally project transversely and outwardly from opposite ends of said support and define an axis about which said sash structure rotates.

33. The furrow forming apparatus according to claim 31 wherein said support defines a pair of detents on at least one of said front and rear walls thereof for releasably holding said locking pins out of engagement with said linkage assembly.

34. The furrow forming apparatus according to claim 7 wherein said sash structure is movable relative to said support to allow the angular position of said sash structure to remain constant along said predetermined path of travel while the angular position of the support varies along said predetermined path of travel.

35. The furrow forming apparatus according to claim 34 wherein said sash structure further comprises a pair of brackets rotatably attached to opposite ends of said support and adapted to slidably engage respective ones of said links.

* * * * *